(12) United States Patent
Wyatt et al.

(10) Patent No.: US 8,165,702 B2
(45) Date of Patent: Apr. 24, 2012

(54) ARTICLE MANUFACTURING PROCESS

(75) Inventors: Joseph B. Wyatt, Redlands, CA (US); Hossein Haj-Hariri, Charlottesville, VA (US)

(73) Assignee: Accudyne Systems Inc., Newark, DE (US)

( * ) Notice: Subject to any disclaimer, the term of this patent is extended or adjusted under 35 U.S.C. 154(b) by 378 days.

(21) Appl. No.: 12/463,007

(22) Filed: May 8, 2009

(65) Prior Publication Data

US 2010/0286808 A1    Nov. 11, 2010

(51) Int. Cl.
*G06F 19/00* (2011.01)
*B32B 37/00* (2006.01)
*B32B 37/02* (2006.01)
*B32B 3/00* (2006.01)
*D04H 3/00* (2012.01)

(52) U.S. Cl. ............ 700/97; 156/64; 156/160; 156/167; 428/156

(58) Field of Classification Search ............ 700/97; 156/64, 160, 167; 428/156
See application file for complete search history.

(56) References Cited

U.S. PATENT DOCUMENTS

| | | | |
|---|---|---|---|
| 4,234,374 A * | 11/1980 | Frank | 156/459 |
| 4,285,752 A | 8/1981 | Higgins | |
| 4,696,707 A | 9/1987 | Lewis et al. | |
| 4,707,212 A | 11/1987 | Hailey et al. | |
| 4,750,965 A | 6/1988 | Pippel et al. | |
| 5,041,179 A * | 8/1991 | Shinno et al. | 156/64 |
| 5,045,147 A | 9/1991 | Benson et al. | |
| 5,114,519 A | 5/1992 | Grimshaw et al. | |
| 5,117,348 A | 5/1992 | Romero et al. | |
| 5,290,389 A | 3/1994 | Shupe et al. | |
| 6,516,833 B1 * | 2/2003 | Witz et al. | 138/135 |
| 6,735,866 B2 | 5/2004 | Nogueroles Vines et al. | |
| 7,080,441 B2 | 7/2006 | Braun | |
| 7,289,656 B2 | 10/2007 | Engelbart et al. | |
| 7,869,982 B2 * | 1/2011 | Drumheller et al. | 703/1 |
| 2006/0073309 A1 * | 4/2006 | Hogg | 428/156 |
| 2006/0073311 A1 | 4/2006 | Hogg | |
| 2008/0156436 A1 * | 7/2008 | Johnson et al. | 156/324 |

FOREIGN PATENT DOCUMENTS
WO    WO-2006041768    4/2006

OTHER PUBLICATIONS

Grimshaw, "Automated Tape Laying", D.B. Miracle & S.L. Donaldson: *Composites*, vol. 21, pp. 4821-485 (2001).

* cited by examiner

*Primary Examiner* — Michael D Masinick
*Assistant Examiner* — Sivalingam Sivanesan
(74) *Attorney, Agent, or Firm* — Connolly Bove Lodge & Hutz LLP

(57) ABSTRACT

A substrate having a surface representative of the geometric shape of the article is first modeled. Then, a plurality of paths for placing tape strips upon the substrate are serially defined. The first path is defined by first starting coordinates and an initial angle such that it follows a natural path along the surface of the modeled substrate. Subsequent paths are also defined by their respective starting coordinates and initial angles, wherein the starting coordinates are disposed adjacent a adjacent path and the initial angle causes the subsequent path to follow a natural path along the modeled substrate. The starting coordinates are adjusted to minimize a minimum gap between the adjacent paths, and the initial angle is adjusted to minimize an average gap between adjacent paths, all without the paths overlapping. Finally, tape strips are laid upon the substrate according to the defined paths, thereby forming the article.

11 Claims, 6 Drawing Sheets

ARTICLE MANUFACTURING PROCESS

BACKGROUND OF THE INVENTION

1. Field of the Invention

The field of the present invention is manufacturing processes, particularly manufacturing processes which construct articles using layered tapes.

2. Background

Evolving industrial needs have created a growing dependence on lightweight material solutions and rapid machining processes. Composite materials are a leading force in this industry, providing extremely light weight parts that can be designed to suit specific thermal and structural needs. For example, the aircraft industry depends on composites for many different parts used in constructing passenger airplanes, to the extent that some of the newest models are constructed from between 50% to 60% composite materials. The growing dependence of many industries on high quality composite parts means that a reduction in production costs and an increase in production speed and quality are needed. The still-developing industry of composite parts manufacture, however, still employs relatively slow and expensive methods of production. In addition, the current methods are limited in the types of parts that may be produced.

One advance in the manufacture of composite articles involves the layering of composite tapes, or tows, across a mold at prescribed orientations. The tapes typically consist of parallel, unidirectional fibers within a resin matrix, and numerous layers of adjacently laid tows may be stacked in a series of plies to create a final article having a desired thickness. The resulting composite substrate has material properties given by the filament properties within the tows and the orientations of the various plies. While much of this manufacturing process can be automated, difficulties with automation arise as the shape of the manufactured articles become more complex. For geometrically complex articles, or even those with large surface gradients, the tows are often laid by hand or their positions are manually entered into the automated system (as opposed to the positions being calculated by the system itself). Thus, event with currently available automated systems, complex parts can be time consuming and expensive to manufacture.

Automated tow laying systems currently employed often use an open bay, gantry style machine to lay unidirectional fiber tows of a given width on a predefined surface mold. Such systems generally have three to six degrees of freedom and are computer numerically controlled. Many different processes of controlling these automated systems have been developed over time with the primary goals being (1) minimizing gaps between tows; (2) maximizing coverage by the tows; (3) minimizing strain placed on individual tows; and (4) minimizing tow wrinkling and puckering. In furtherance of these goals, so called "natural path" algorithms were developed to minimize strain, wrinkling, and puckering.

Although many different types of gantry style systems my be employed, a typical system with which a person of skill in the relevant arts might be familiar is described below. In such a typical gantry style system, the gantry head includes a robotic applicator that is suspended on parallel rails above the part being assembled. Linear movement of the head along the rails provides two degrees of freedom. Two additional degrees of translational freedom and three degrees of rotational freedom are be built into the gantry head or the robotic applicator itself. This arrangement permits the gantry to operate in an xyz defined space, meaning that any point along a surface mold are capable of being defined by a global Cartesian coordinate and a normal vector to establish the orientation of the point. Thus, motion of the gantry head and robotics applicator is directed by providing a series of incremental coordinates and their associated orientations. This sort of system has greatly simplified motion calculations and control for automated tape laying systems. Further, this simple input allows the gantries to be constructed to cover large working spaces, move at high velocities, and work with both high precision and accuracy.

The gantry head also includes a carrier and a roller, which are used to apply the tows to the mold, and a tow spool from which tow is supplied during application. The carrier and roller control tow alignment, orientation, and tension during placement. The gantry head might also include an optical device to aid in monitoring the tow laying process and the tow material itself, as flaws and weaknesses in the tow material are common due to difficulties in manufacturing consistent, uniform composite material. A heater within the head increases tow temperature during placement to heat tow to an appropriate bonding temperature, and a cutter separates a given tow from the tow spool. At the interface between the tow and the substrate, a spring loaded shoe maintains near constant pressure over the varying contoured surfaces of the substrate to control the trajectory of the applied tow and to minimize slippage off the intended tow path. The shoe is followed by a compaction roller to ensure uniform bonding over the entire tow width and to prevent air gaps. The applied pressure is typically dependent upon the type of tow material and resin being used. Sensors are also often included to detect stresses placed on the gantry head during tow application. Low stress serves as an indicator of poor bonding between the tow and the substrate, while excessive stress serves as an indicator of path definition errors, which can lead to tow wrinkling or tearing.

Such gantry systems may be employed with varying degrees of automation and human interaction. In "single phase" systems, the process is fully automated, from feeding, placement, and cutting of the tow. In "two phase" systems, tow placement is separated from tow cutting. Here, tows are cut to specified shapes and sizes in a pre-processing stage before being spooled and placed onto the gantry head for application. In "two phase" applications, since all cuts and paths are predefined, the application stage can proceed more quickly; unfortunately, the pre-processing stage can be very time consuming and costly. Finally, some gantry systems are designed as "dual phase" systems, with which either "single phase" or "two phase" processes may be employed.

The overall success and speed of almost any gantry system, including the quality of the articles produced, however, is highly dependent upon the definition of the tow paths. Simply put, poorly defined paths yield poor quality parts. Path generation, in it's simplest form, can be and was done by hand. But, hand methods are extremely slow, have very low repeatability, and provide no ability to analyze the product being produced prior to completion of production. Gantry systems have been employed to increase repeatability and speed, but gantry systems that rely on input from the operator for initial tow path definition still do not provide any pre-production analysis ability. In view of this problem, "natural path" tow path definition methods were developed. In the natural path process, tow paths are defined by the contours of the surfaces using the state of lowest stress induced in applied the tow strips. Natural path techniques further evolved so that tow paths were defined by natural geodesic paths.

More recently, natural geodesic path determination have been refined to vary the initial angle of the tow path to within a maximum threshold, thereby reducing application deformities and gap separations between adjacent tow strips. In this technique, each subsequent tow path is calculated from the previous path. However, this means that if a non-optimal first path is selected, high strains and wrinkle areas might be produced after many adjacent paths are laid.

In another advance of natural geodesic path determination, isoparametric projections and numerical convergence techniques have been employed to enhance tow path definition. This technique, however, appears to be overly sensitive to local extremes of the substrate and may result in convergence to tow paths that overlap undesirably.

SUMMARY OF THE INVENTION

The present invention is directed toward a manufacturing process in which the paths for tape strips are defined to prevent overlap of tape strips and minimize gaps between adjacent tape strips once the tape strips are applied to a substrate according to the tape path definitions. Initially, a substrate is modeled to have a surface based upon the desired geometric shape of the article. Next, a plurality of paths for placing tape strips are serially defined on the modeled substrate. The first path is defined by starting coordinates and an initial angle such that the first path follows a natural path along the surface of the modeled substrate. Subsequent paths are defined by respective starting coordinates and initial angles, wherein for each subsequent path, the starting coordinates are disposed adjacent an adjacent path; the initial angle is selected such that the subsequent path follows a natural path along the surface of the modeled substrate without overlapping the adjacent path; the starting coordinates are adjusted to minimize a minimum gap between the subsequent path and the adjacent path without overlapping the adjacent path; and the initial angle is adjusted to minimize an average gap between the subsequent path and the adjacent path without overlapping the adjacent path. After the model is complete, tape strips are laid upon the substrate according to the defined paths to form the article.

Subsequent paths may also be subjected to forced path realignment following adjustment of the starting coordinates and the initial angle. This forced path realignment may include forcing each subsequent path off the natural path in the binormal direction to reduce gaps between the subsequent path and the adjacent path.

As another option, the process may be applied separately to different layers on a substrate model so that the manufactured article may be constructed by a series of plies.

Accordingly, an improved article manufacturing process is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
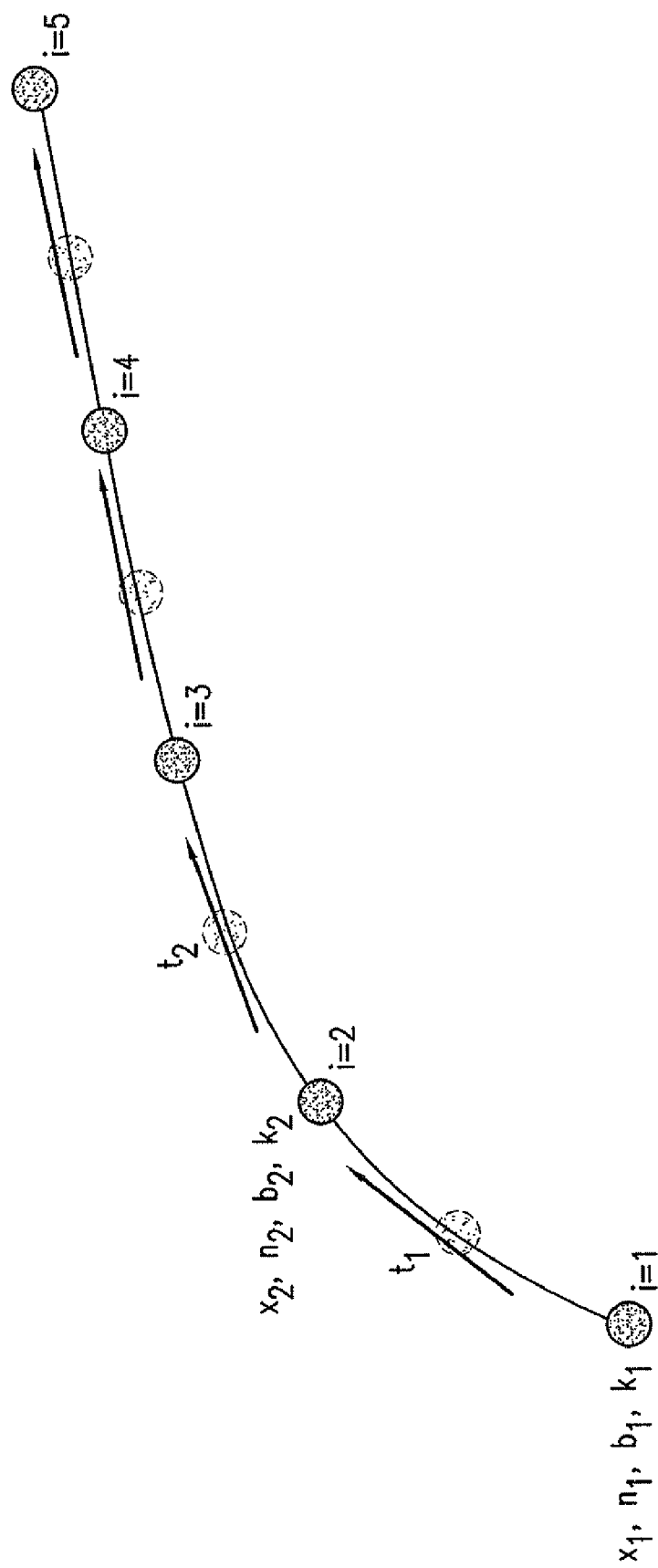
FIG. 1 illustrates the formation of a coordinate system as a series of staggered grids formed by centerlines along an arc length.

The article manufacturing process begins by mathematically modeling a substrate as a geometric representation of the desired final article. The substrate model is then employed in a tape strip modeling process, which models the placement of tape strips on the substrate in different configurations. These different tape strip configurations may then be analyzed to identify a preferred configuration for manufacturing the article by placement of tape strips according to the selected configuration. The preferred configuration may be selected based upon any number of criteria, most particularly those derived from the intended application for the manufactured article. In this manner, the properties of the produced article itself inform and drive the manufacturing process for the article in a manner that requires significantly less trial and error for the process, and the process is one that may be substantially automated, thereby enabling savings in both time and money for the design and manufacturing processes.

The substrate model may be generated using any known mathematical modeling processes. For example, the substrate model may be analytically defined, discretely defined, or defined through use of computer aided design (CAD). The latter is a useful for visually modeling a substrate, but since CAD systems generally represent models as a data set formed from an unstructured grid of coordinate vertices with normal vectors describing local surface orientations, the data associated with surfaces modeled in CAD systems must be translated into a form useable with the tape strip modeling process described below.

The approach described below represents a kinematic approach to modeling a manufactured article formed from tape strips. This approach largely ignores the properties of the materials themselves, and focuses on quantification of strains and wrinkles in tape strips that arise due to purely geometrical considerations. This is accomplished through the use of kinematic trajectories and reference frames in which equations for the modeling are developed. For example, a basic system for kinematic trajectories in a three dimensional Euclidean space may be described by a set of Frenet Serret coordinates. Such coordinates establish the local position and orientation of a particle traveling a continuous, non-degenerate path relative to the global coordinate system. In the context of the tape path modeling system described herein, the geometrical configuration of the substrate defines the global coordinate system, and the centerline of the tape strip is the continuous, non-degenerative path. Thus, the local orientation at any point along the path is established using three unit vectors, the normal, n, the binormal, b, and the tangential, t, where the binormal is the cross-product of the normal and the tangential. Meaning, that the local direction of travel along a curve x(s), where s is the arclength parameter and x is the position vector in "normal" space, the instantaneous direction is given by $$t = dx/ds, \quad (1)$$

and since |dx/ds|=1 in such systems, the local orientation may be further described by $$n = -(dt/ds)/|dt/ds|. \quad (2)$$

Finally, as incremental steps are taken along the curve, these vectors may be described by $$dt/ds = -k\, n;\quad(3)$$

$$dn/ds = k\, t + T\, b;\text{ and}\quad(4)$$

$$db/ds = -T\, n;\quad(5)$$

where $k=|dt/ds|$ and is the curvature, $T=|db/ds|$ and is the twist, and the twist is positive when the twist-psuedo vector is aligned with t. This reference system is applied to the tape strip modeling process to determine the fit of a tape strip along a path on the substrate model, the path being defined by a centerline.

Once the substrate has been modeled, other initial conditions need to be defined before the tape strip modeling process can begin. These initial conditions include the width of the tape strips, the starting point on the substrate model for the first tape strip, and the starting orientation on the substrate model. While the width of the tape strips across a manufactured article may vary from tape strip to tape strip, the tape strip modeling process typically begins with use of single width tape strips, and as the process continues, tape strips having smaller widths may be incorporated into the design to reduce material strain and decrease wrinkling.

The tape strip modeling process proceeds by sequentially defining paths for each tape strip, each path having the same width as the intended tape strip and being defined along the centerline of the tape strip. Each path is therefore modeled as sequential arrays containing the x,y,z coordinates for each of the tape centerline, left edge, and right edge. Thus, the first step of the tape strip modeling process is to generate the centerline trajectory for the first path based upon the selected starting point and starting orientation for this first path. At this early stage of the tape strip modeling process, the trajectory of the centerline for each path follows natural paths, as defined by mathematical geodesics, such that the path centerline normal vector aligns with the substrate normal vector. The centerline paths are treated as Euclidian space curves that follow the first order system from equations (1) and (3) above, and this system can be solved iteratively, so that path of the centerline is modeled by:

$$x_i = t_{i-1}\cdot ds + x_{i-1};\quad(6)$$

$$t_i = -ds\cdot k_i\cdot n_i + t_{i-1};\quad(7)$$

$$k_i = 2(n_i\cdot t_{i-1})/ds;\quad(8)$$

$$b_i = ((t_i + t_{i-1})/2)\times n_i;\quad(9)$$

and $n_i$ is set equal to the surface normal vector of the substrate model at $x_i$. Incrementations for each of these vectors as centerline paths are generated along an arc is shown in FIG. 1.

The edges of the tape strip may then be modeled as half of the width, w, from the centerline along the local binormal:

$$x_{right} = x_{center} + (w/2)\, b;\text{ and}\quad(10)$$

$$x_{left} = x_{center} - (w/2)\, b.\quad(11)$$

In some instances this models the tape path edges as protruding into or projecting off the substrate. When the actual article is manufactured, the tape strips would be pressed onto the substrate, with the locales where the model shows protruding or projecting edges raising the risk of introducing wrinkles into the physical tape strips. The risk of wrinkling will generally be a function of the amount of protruding or projecting in combination with the materials from which the tape strips are manufactured. Thus, where some materials may tolerate a certain amount of protruding or projecting without leading to wrinkling, other materials may have much lower tolerances for such protruding or projecting.

Additionally, tape strip edges are subject to stretching and strains as the path lengths followed by the edges increase as compared to the path length followed by the centerline. Again, different materials are expected to have different tolerances to stretching and straining. This modeling process therefore provides numerical data which may be evaluated against known material properties when applying tape strips.

Each subsequent path is begun one full width over from the centerline of the previous path. After the centerline of an adjacent path is defined, path separations are minimized by calculating the distance between adjacent paths. The separation is represented by a distance vector, d, between every point along the edge of a path to the nearest edge of the adjacent path along the binormal, which is calculated using the nearest point. For one edge of the path, the dot product of this distance vector with the binormal at any given point is negative if the edges overlap and positive if there is a gap, and the magnitude at that point represents the amount of overlap or gap. For the opposite edge of the path, the reverse is true. The minimum, maximum, and average of the magnitude of d along the entire path therefore provides the minimum, maximum, and average gap distances, respectively, between the adjacent paths. With this information, the paths can be optimized to minimize the average gap between adjacent paths. This is done by adjusting both the starting location and the initial angle of the path.

Natural paths are still followed as this first stage of optimization is conducted. Both the starting location, $x_0$, and the initial angle, $\theta$, are adjusted using a search-based optimization technique to minimize the total gap between adjacent paths. To optimize the starting location, a basic line search algorithm is implemented to minimize the minimum gap distance as constrained by a spacing tolerance. This ensures that two adjacent paths are coincident within the spacing tolerance, without overlap, at a single point for a constant initial angle. For this line search, $\alpha$ represents the position along the closed curve forming a boundary edge of the substrate model, and the optimization objective is to minimize $f(\alpha)$, where f is the minimum gap distance for the natural path having a starting position of $\alpha_i$. An additional constraint may be introduced wherein the starting position of the path must be a minimum distance from the boundary edge of the substrate model. With these constraints set up, the search is done according to the following steps:

1) $\alpha_i = \alpha_{i-1} + \lambda(d\alpha)$
2) Evaluate $f(\alpha_i)$
3) If $f(\alpha_i) > f(\alpha_{i-1})$, then $\lambda = -\lambda$ & $d\alpha = d\alpha/2$
4) Repeat until $d\alpha < d\alpha_{tolerance}$ where $\lambda$ serves as both a counter and an indicator of search direction, $d\alpha$ represents changes in $\alpha$, and $d\alpha_{tolerance}$ is a minimum stepping tolerance. By following these steps, $\alpha$ is varied in increments of $d\alpha$, both positively and negatively, until a minimum gap distance is found, within a desired tolerance.

The same type of line search is performed based on changes in the initial angle:

1) $\theta_i = \theta_{i-1} + \lambda(d\theta)$
2) Evaluate $f(\theta_i)$
3) If $f(\theta_i) > f(\theta_{i-1})$, then $\lambda = -\lambda$ & $d\theta = d\theta/2$
4) Repeat until $d\theta < d\theta_{tolerance}$ where $\lambda$ serves as both a counter and an indicator of search direction, $\theta_i$ is the starting angle, $d\theta$ is changes in the starting angle, $f(\theta)$ is the average gap between adjacent paths and is the function being minimized, $d\theta$ is the stepping angle and $d\theta_{tolerance}$ is a minimum stepping tolerance for changes in the starting angle. By following these steps, θ is varied in increments of dθ, both positively and negatively, until the average gap between adjacent paths is minimized.

Simultaneous optimization may also be performed by nesting the starting position search within the initial angle search, thereby minimizing the smallest gap between paths for each incremental angle step. This would ensure that the overall total gap is minimized between adjacent paths upon convergence of the line search for the initial angle.

Figure 2:
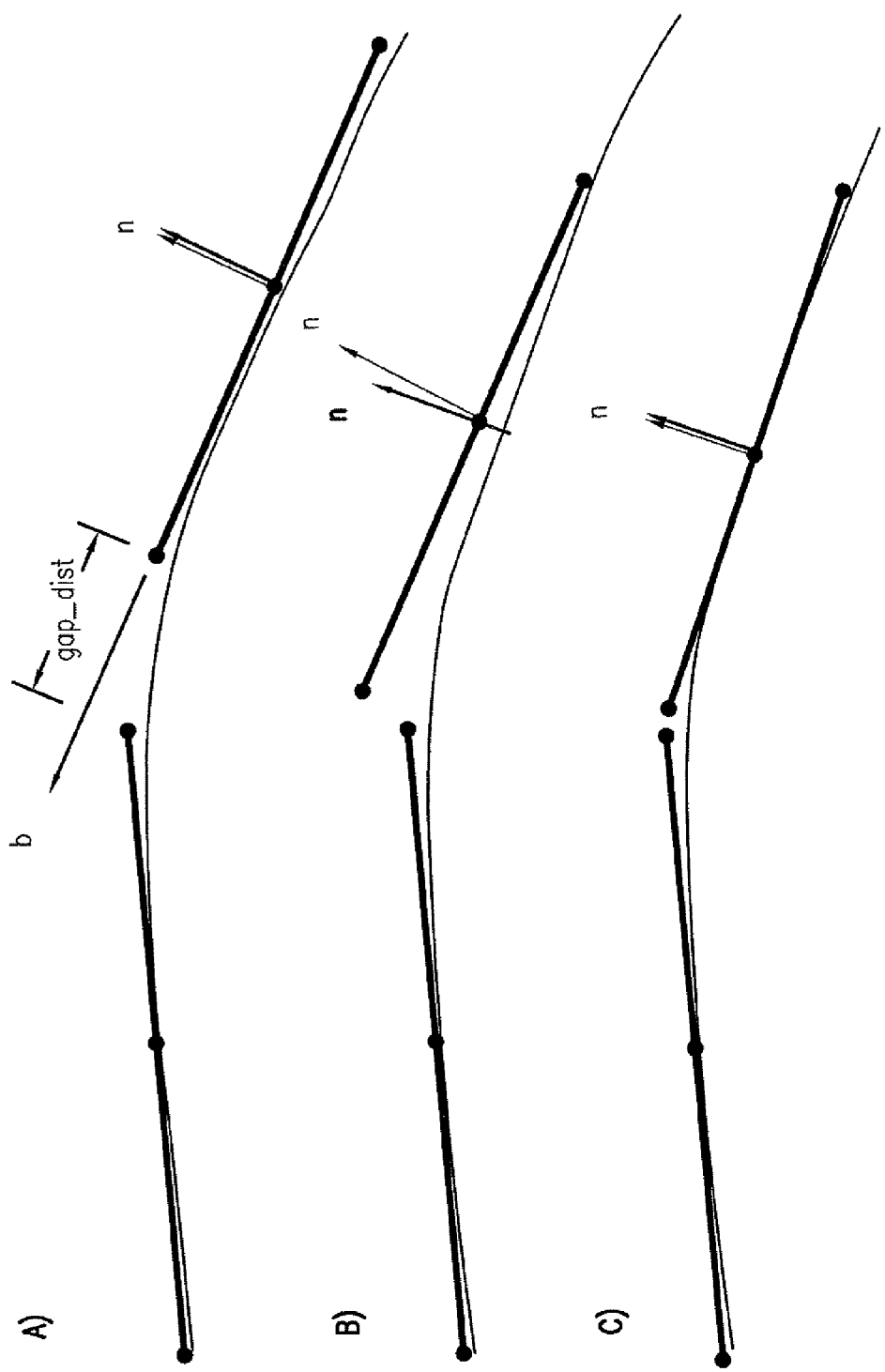
FIG. 2 illustrates a method of performing a forcing algorithm.

Following natural geodesic paths along substrates having large curvatures can produce large gaps, even after optimizing the starting position and initial angle of the paths. In most cases, gap distances can be further reduced, or even sometimes eliminated altogether, by forcing tape paths off the natural geodesic path following the above starting position and initial angle optimizations. The forcing algorithms have five basic steps and is performed as an iterative process to reduce the average gap distances to within any desired tolerance:

1) shift the centerline of a path in the direction of a binormal, as given by the product of the gap distance between the path and the adjacent path with a convergence parameter of between 0 and 1. FIG. 2, step A, illustrates this centerline shift. Setting the convergence parameter closer to 0 results in the need for more iterations of the forcing algorithms. On the other hand, setting the convergence parameter closer to 1 results in the need for fewer iterations of the forcing algorithms, but potentially with the introduction of additional stresses. Through computer simulations, a convergence parameter of about 0.5 has been found appropriate;
2) project the centerline coordinate onto the substrate surface along the normal passing through the centerline coordinate following the shift—this projection also represents the closet point on the substrate surface from the centerline. FIG. 2, step B, illustrates this centerline coordinate projection;
3) align the centerline normal vector with the substrate normal vector at the projected point on the substrate surface. FIG. 2, step C, illustrates this normal vector realignment;
4) calculate the new binormal vector (the tangential vector remain unchanged); and
5) recalculate edges based upon the new binormal.

After the optimization and forced path procedures have been completed, design metrics for the tape strips may be evaluated to determine how much stress the modeled paths will cause on the tape strips and to determine the tendency of the tape strips to wrinkle when applied to the modeled paths. Tape strain, ϵ, is defined as an elongation of fibers relative to the original length:

$$\epsilon = |(x_i - x_{i-1})|_{edge} / |(x_i - x_{i-1})|_{centerline} - 1. \quad (12)$$

Defined in this manner, tape strain that is greater than 0 describes material stretch, while strain less than 0 indicates that the tap may have a tendency to wrinkle. As indicated above, this tape strain should be considered in conjunction with the materials from which the tape is made to fully evaluate whether too much stretch or tendency to wrinkle is present in a given design configuration.

Figure 3:
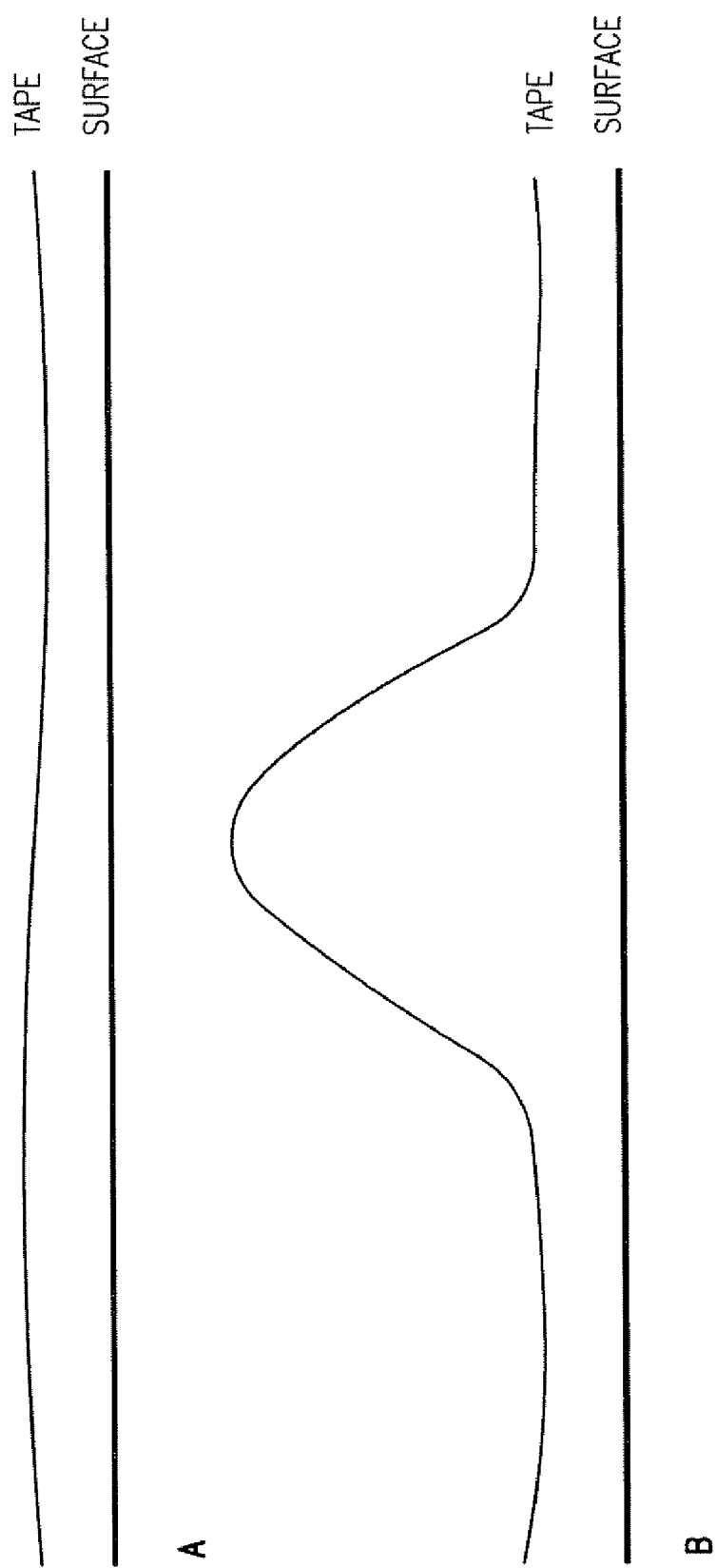
FIG. 3 illustrates examples of tape strip height above a substrate, as used to determine the likelihood of tape wrinkling.

Tape wrinkling may be divided up into two different classifications for purposes of quantifying the tendency of tape strips to wrinkle. The first wrinkle type is indicated by negative tape strain, which measures wrinkles due to severe tape deformation. The second wrinkle type is indicated by severe surface curvature in which the edge length of the tape does not coincide with its projected length on the surface, thereby resulting in a fold wrinkle. In order to quantify fold wrinkles, the height of the path edges above or below the substrate surface are determined, and the slopes of the height give the likelihood of a fold wrinkle developing:

$$h = z_{tape} - z_{surface}; \quad (13)$$

$$w = dh/ds, \quad (14)$$

where h is the difference in height and w is a quantitative representation of the tendency of a tape strip to form a fold wrinkle. Examples of how these latter two equations apply is illustrated in FIG. 3. In Example A, the tape path is relatively free of significant variations in slope as compared to the surface. Thus the tendency of the tape in Example A to wrinkle is relatively low. In Example B, the tape path includes a significant change in slope. At points where the slope of the tape varies significantly from the slope of the surface, the tape in Example B will have an increased tendency to wrinkle.

In addition to specified coordinates for automated tape laying systems for follow for manufacturing an article, each run through the above modeling process also provides output data for design analysis. This includes average and maximum strains, wrinkling tendency, and gaps for each individual tape path and for the entire substrate. Each tape length is calculated as the product of incremental stepping size and number of steps, N, containing the centerline points.

The data also provides the ability to determine the amount of substrate coverage to ensure structural integrity of the final article. The total substrate area may be calculated from the convex hull, while the tape coverage area may be determined as the Boolean overlap between tape areas and the convex hull. The area of the convex hull is given by the area formulation for any irregular polygon. This is found by a general triangular tessellation of the bounding coordinates and summing the area of each triangle. The triangular tessellation may be defined by the set of Delaunay Triangles for a given polygon, given by:

$$\text{Tri}_i = \{x: d(x, P_i) \leq d(x, P_j), \text{ where } I \neq j\}, \quad (14)$$

where $d(x, P_i)$ gives the distance between a given point x and the field of points P for tessellation. Minimization of this gives closest point tessellations, for which each area sum to the convex hull of the substrate.

At the end of the modeling process, the model may be graphically represented to aid in evaluation of whether the modeled article, if manufactured, will appropriate for its intended purpose. Some sample graphs are shown in FIGS. 1-3, which include graphs for centerline and edge paths, tape patches, strains, and tape gaps. Additional graphs for fold wrinkles and negative strain wrinkles might also be produced, but are not shown as part of the figures.

CAD Integration

The challenge in CAD integration lies in converting the surface representation data into a structured form that can be employed using the aforementioned processes. As was mentioned above, CAD systems generally represent models as a data set formed from an unstructured grid of coordinate vertices with normal vectors describing local surface orientations. Through functions integrated into MATLAB®, vertex data from models produced by CAD systems can be transformed into a model useable in the modeling processes described above. Such functions are available through an open source community that shares MATLAB® solutions. Such open source solutions for MATLAB® are frequently used by those skilled in the art, and may be found at the MATLAB® Central web site. The following steps may be used to transform vertex data into a useable surface model:
1) Apply a structured mesh through the triangular interpolation based function griddata, which can be integrated into MATLAB®;
2) To allow extrapolation and interpolation at and around the unstructured edges, an inverse-distance weighing technique, fillnans in MATLAB®, is used to fill in unknown values in an evenly structured grid;
3) Generate the convex hull for the data used to identify the surface edges, given by the following set:

$$H_{convex}(X) = \left\{ \sum_{i=1}^{k} \alpha_i x_i \middle| x_i \in X, \alpha_i \in \mathbb{R}, \alpha_i \geq 0 \sum_{i=1}^{k} \alpha_k = 1, k = 1, 2, \ldots \right\}.$$

where x is a subset of points in X comprising the convex hull and α is a number between zero and one in which all $\alpha_i$ sum to one; the predicate statement $\alpha_i x_i$ defines the convexity requirement. (See Cormen, T. et al. "Finding the convex Hull" *Introduction to Algorithms*, London, UK, MIT Press, 2001:947-957.); and
5) From user defined domain corners, map the domain edges to the convex hull from which tape strips will start and stop.
Once this point is reached, all calculations and procedures may be applied as previously described.

The processes described above result in output that defines machine paths for the manufacture of articles through the laying of tape strips, such as is commonly done in the manufacture of composite parts. The output enables a tool, such as a gantry system, to be linked to the surface geometry of the substrate model, thereby allowing the manufacture of the modeled article with substantially less human involvement.

However, the process also serves as a design tool by predicting strains and wrinkles for various tape configurations and sizes over a wide range of initial conditions. This can aid manufacturers in optimizing time and costs in many ways, such as by selecting a sufficiently large tape spool for high speed production while also keeping the manufactured article within acceptable wrinkling and strain tolerances. For example, the goal of the manufacturer is to maximize tape widths because this is directly related to the weight per hour at which the manufacturing equipment will lay tape, and the part weight per hour determines how quickly parts may be created, thereby relating directly to profits. However, the use of wider tape widths makes it more difficult for the manufacturer to cover a surface mold while maintaining acceptable control over strain and wrinkling. The process thus enables modeling an article using different tape widths, or even tapes of different widths, so that the different models can be compared prior to manufacture, thereby increasing the overall efficiency of the manufacturing process.

Example Geometries

Figure 4:
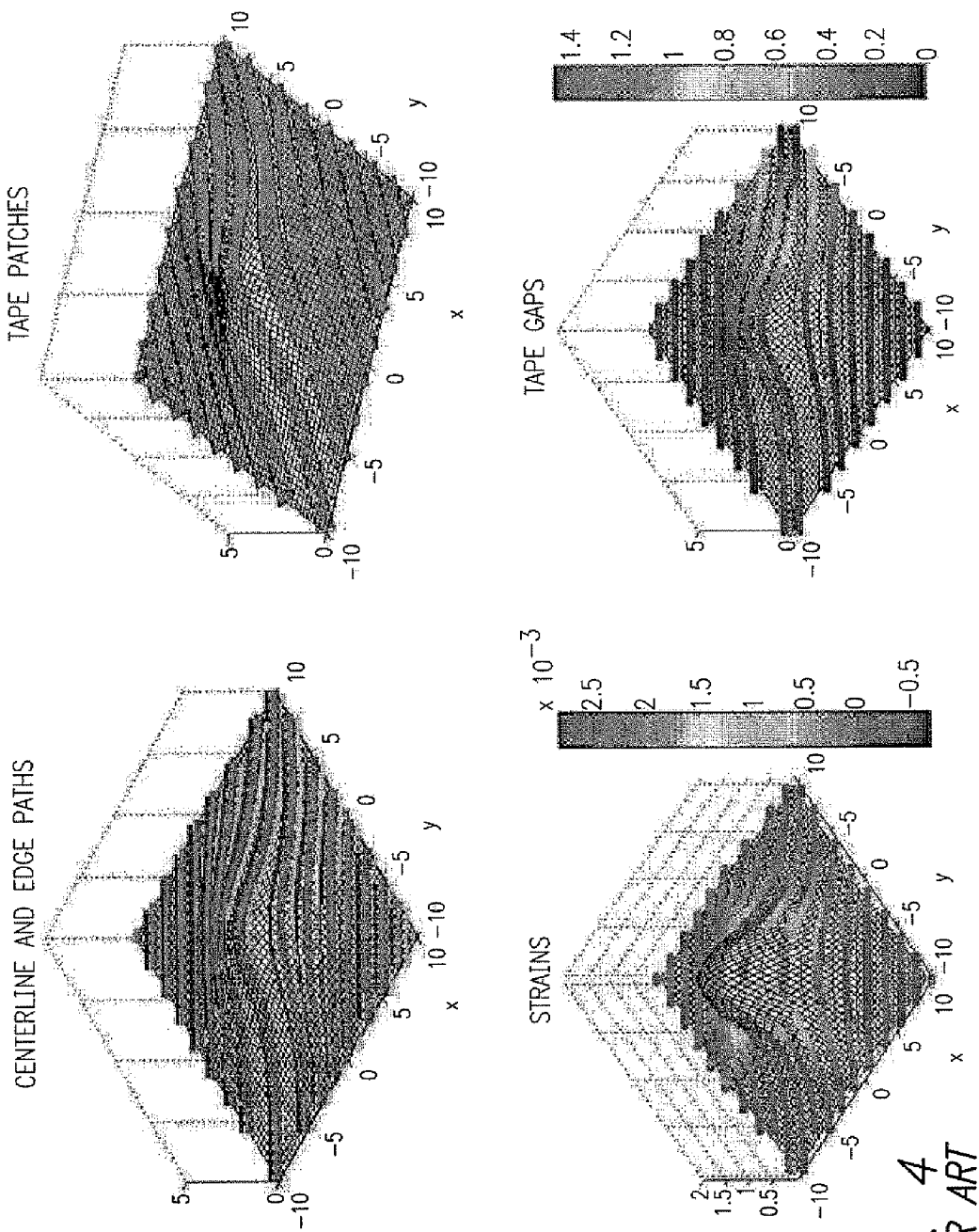
FIG. 4 illustrates simulated tow paths using basic natural paths.
Figure 5:
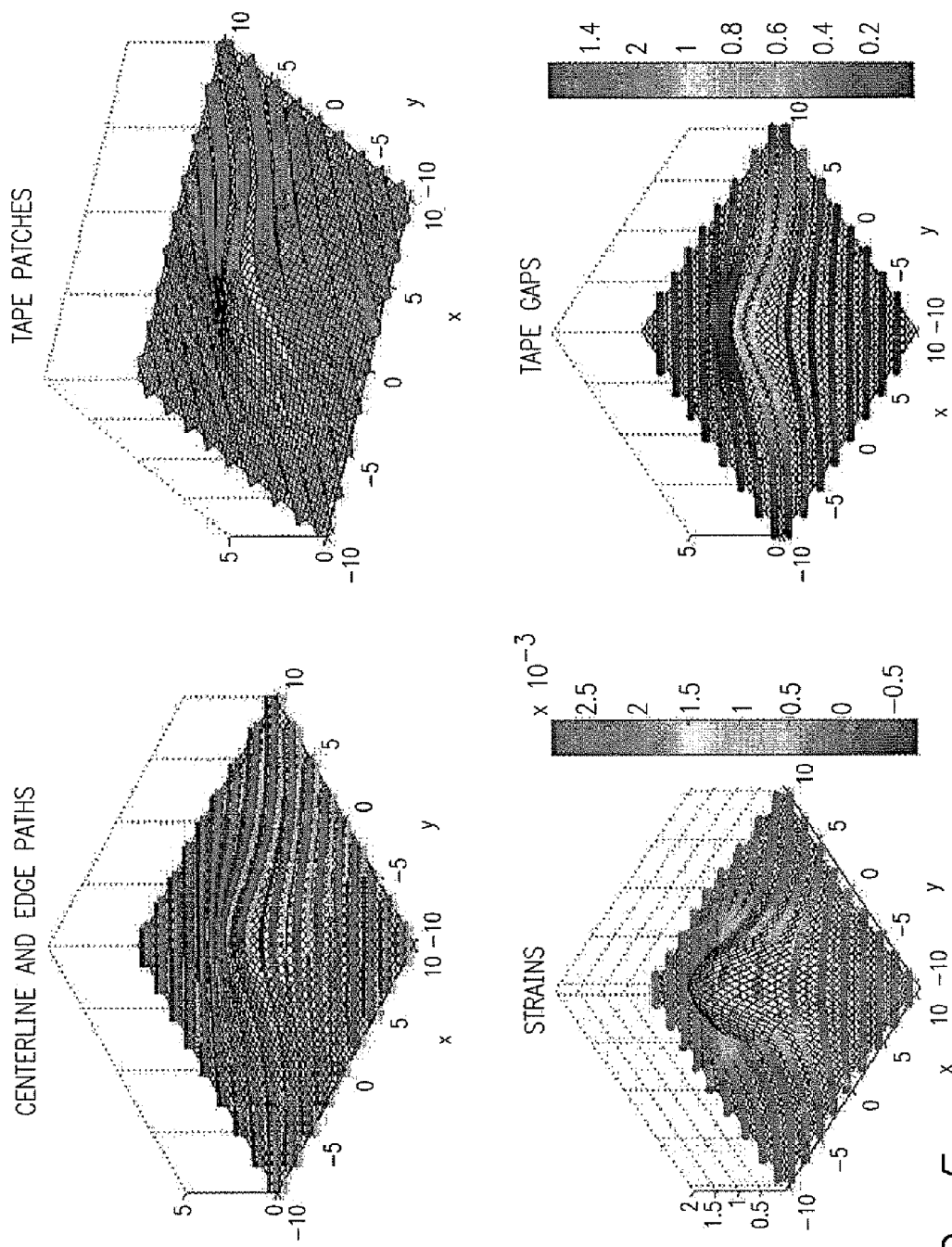
FIG. 5 illustrates simulated tow paths using natural paths enhanced by initial angle optimizations.
Figure 6:
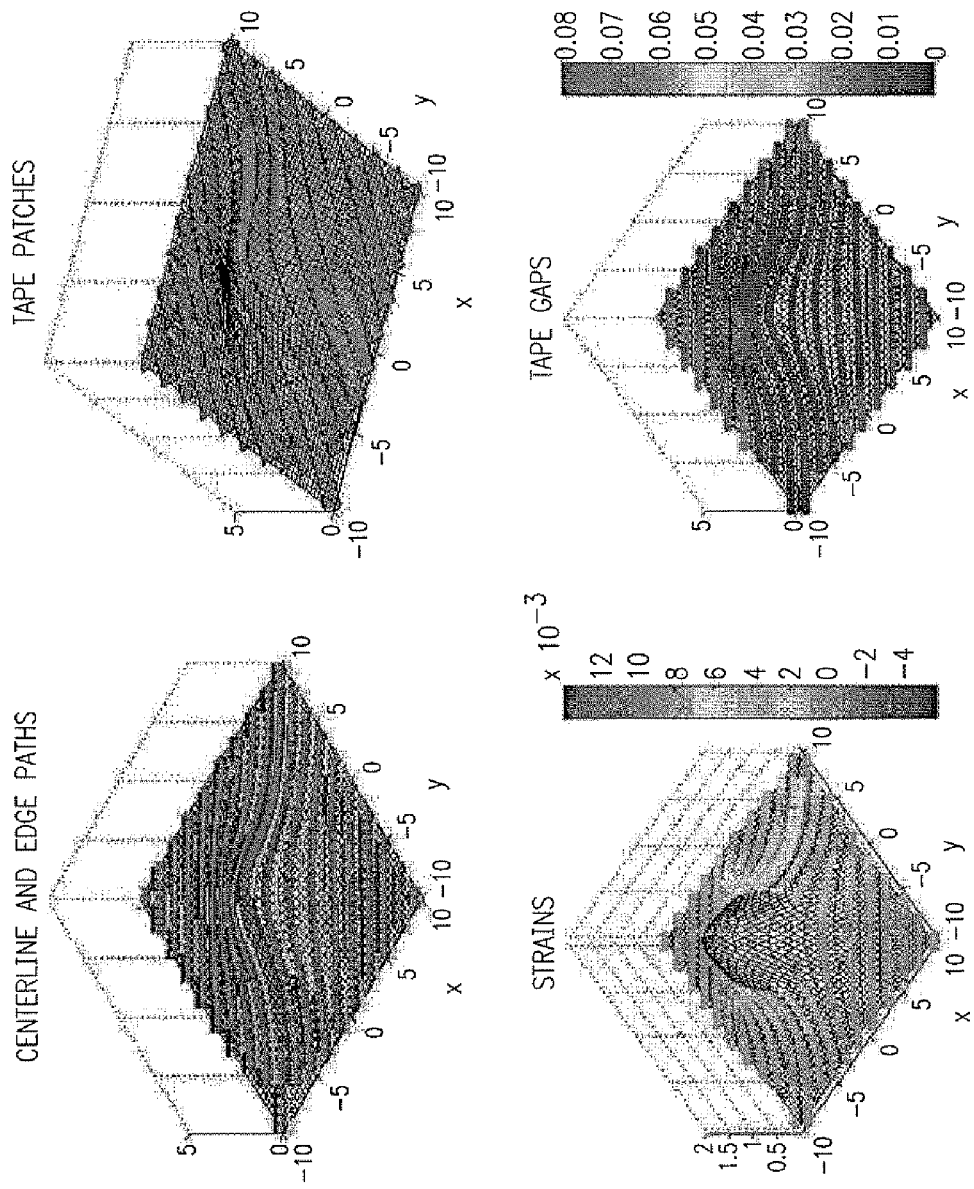
FIG. 6 illustrates simulated tow paths using natural paths enhanced by initial angle optimizations and forced path adjustments.

FIGS. 1-3 show graphical representations of data output from the processes described above for a simple hump geometry, which is presented as an example to illustrate strain values and gap elimination associated with simulated three inch tape. The surface model here is formed by the two-dimensional tensor product of two hyperbolic secants with a given height, h. Three different cases are illustrated: FIG. 4 illustrates a natural path orientation for all tape paths without any optimization; FIG. 5 illustrates a natural path orientation for all tape paths with only initial angle optimization; and FIG. 6 illustrates a natural path orientation for all tape paths with initial angle optimization and forced path realignment. Further, each illustration shows four different plots, starting from top left and proceeding clockwise: 1) right and left edge paths for all tapes paths; 2) tape coverage; 3) gaps between adjacent tapes; and 4) strains on individual tapes.

A comparison of these plots shows that the initial angle optimization begins to close gaps and reduce the effect of strains on the tape, while the combination of initial angle optimization and forced path realignment further closes the gaps and reduces the effect of strains on the tape. Numerically, the average gap from the strictly natural path orientation is about 0.9 units. This value is reduced to about 0.25 units when the initial angles are optimized to a range of 45±5 degrees, and it is further reduced to about 0.08 units following a single iteration of forced path realignment. Increasing the forced path realignment to three iterations decreases the average gap over the entire surface to about 0.001 units. However, one consequence of the additional iterations is that the average strain increases by an order of magnitude, from 0.0002 to 0.002, over the entire surface after the second iteration of forced path realignment. The significant factor in this increase is focused in areas of maximum curvature on the rear side of the hump. This is due to both the associative stretching of the edges to accommodate the severe curvature and to the significant shifts over the areas with the largest gaps, requiring significant forcing distances. However, regardless of the strain effects, a maximum strain of 0.2% would present little to no risk of failure for most manufactured articles.

Another example examines the results when the processes described above are applied to a pad-up geometry, which is a common feature found in aircraft panels, at joints for part attachment, and in areas of concentrated loading. Pad-ups are small raised geometries with ramped edges used to locally increase strength and stiffness without significantly increasing the total weight of the part. Impregnated ply layers are built up to created the small raised section. After the desired thickness is achieved, additional layers are added to smooth the thickened area and create the final desired aerodynamic shape. The additional layers, like all layers, should minimize gaps, wrinkles and strains, however, the jump discontinuities of the substrate slopes can present significant challenges for doing so. Significant wrinkling can occur as the width of the tape approaches the length scale of the pad-up section. These factors are also dependent on the pad-up ratio of transverse surface units to rise, given by the ramp's inverse slope. Therefore accurately predicting the relationship between the pad-up ratio and the strains and wrinkles for a given tape width can significantly increase the efficiency of manufacturing such articles.

For a standard 10 to 1 pad-up, located in the center of a square meter panel, the pad-up section is an elevated, ten inch square located in the center of a flat mold with ramped edges. The 10-1 ratio indicates the slope of the ramped section surrounding the pad-up. Specifications for this application might require 3 in, 45 degree tape strips. After applying a single iteration of forced path realignment, the gaps are all within a tenth of a millimeter, well under 0.5% strain and with 3% wrinkle tendency.

Another example examines the results when the processes described above are applied to an aircraft cowling, which is modeled using 45 degree tape strips with a 3 inch width. Using natural path alone results in large gaps on the rear side of the cowling, while following forced path realignment all gaps are reduced to within 0.75 mm. However, in this model the gap minimization comes only at the expense of an increase in the strain. The natural path without optimization has a strain of 0.005, while the optimized forced path realignment model increases the strain to 0.03. This increase in strain is due to the large range in curvature across the cowling, which creates significant path separations between the natural paths. Correction of these path separations by forced path realignment generates the high strain. This result indicates that decreasing the tape width is advisable to reduce the overall strain.

Another example examines the results when the processes described above are applied to multiple plies of an aircraft engine fan blade. Such blades generally have both large curvature variations and adjacent areas of concavity and convexity. These features present manufacturing difficulties, but are required so that the fan blade meets designed aerodynamic performance. Half inch tows are desirable for this part, with a bottom ply being placed at 90 degrees, and the top ply at 45 degrees. With complete part coverage, the ninety degree ply yields an average strain of 0.41%, an average wrinkle of 0.006, and tow-length range between 55 mm and 430 mm. These all fall within acceptable limits as determined through experimentation. The forty-five degree ply yields an average strain of 0.63%, an average wrinkle of 0.0008, and tow length range between 50 mm and 585 mm. Due to the compound curvatures near the blade tip, all tows with a length greater than 0.5 m suffered strains outside the allowable tolerance. After rerunning the 45 degree ply with 7 mm tows, the average strain reduced to 0.45%, with an insignificant change in the wrinkle values. Thus, by reducing the tape width by a factor of two, the maximum strain was reduced by 29% and into the acceptable range for part construction.

Other advantages should also be realized from implementation of the above modeling processes. For example, the modeling enables determination of tape strip lengths that are required for a manufacture of a particular article, and where a customized gantry system must be constructed, the modeling helps determine the specifications needed for the gantry system.

As another advantage, the modeling processes may be used to predict the effects of selecting different seed locations for the first tape strip. Selection of the seed location can greatly affect the overall manufacture of the entire article because all subsequent tape strips reference the seed location by virtue of the positioning interrelationship between all the tape strips. For example, a ply with an initial seed location in the center of a part may differ from a ply seeded at one end of that part. Differences may arise in local orientations, starting ply angles, gaps, strains and wrinkles. Thus, proper selection of the seed location may often result in better part coverage, a more uniform distribution of angles, and overall less strain and wrinkles.

Parts with smaller geometric variations may see little change in overall local tape strip angles, however some parts may see up to 100% variation. For example, seeding 45 degree tape strips at the root of the aforementioned fan blade results in 80 degree tape strips at the tip, a result which is due to large geometric variations in the blade and the influence of such variations on the angle optimization algorithm. When local angle variations in one ply become this large relative to adjacent plies, transverse cracking may occur. Local orientations up to 80 degrees mean nearly 35 degrees of local variation if the plies above and below are assumed to be 45 degrees. To correct this issue, shifting the seed location to the center of the part redistributes the angle variation such that the root to tip variation is the same, while the overall maximum variation is considerably less. In the case of the fan blade, shifting the seed point to the center changes the overall angle distribution from 45-80 degrees to 30-60 degrees. This gives a maximum local variation of only 15 degrees, reducing the likelihood for potential cracking.

Thus, a article manufacturing process is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A process for manufacturing an article, the process comprising:
   modeling a substrate having a surface based upon the geometric shape of the article;
   serially defining a plurality of paths for placing tape strips upon the substrate, the first path being defined by first starting coordinates and a first initial angle such that the first path follows a natural path along the surface of the modeled substrate, and subsequent paths being defined by respective starting coordinates and initial angles, wherein for each subsequent path:
   the starting coordinates are disposed adjacent an adjacent path;
   the initial angle is selected such that the subsequent path follows a natural path along the surface of the modeled substrate without overlapping the adjacent path,
   the starting coordinates are adjusted to minimize a minimum gap between the subsequent path and the adjacent path without overlapping the adjacent path, and
   the initial angle is adjusted to minimize an average gap between the subsequent path and the adjacent path without overlapping the adjacent path; and
   laying tape strips on the substrate according to the defined paths to form the article.

2. The process of claim 1, further comprising subjecting each subsequent path to a forced path realignment following adjustment of the starting coordinates and the initial angle.

3. The process of claim 2, wherein subjecting each subsequent path to a forced path realignment includes forcing each subsequent path off the natural path in the binormal direction to reduce gaps between the subsequent path and the adjacent path.

4. The process of claim 3, wherein design metrics includes at least one of tape strain and tape wrinkling tendency.

5. The process of claim 2, further comprising evaluating design metrics of the tape paths through geometrical analysis.

6. The process of claim 1, further comprising defining a plurality of sets of serially defined paths, wherein laying tape strips comprises selecting one of the plurality of sets to follow for laying the tape strips.

7. The process of claim 1, wherein serially defining a plurality of paths includes serially defining a first plurality of paths for placing tape strips in a first layer on the substrate and serially defining a second plurality of paths for placing tape strips in a second layer on the substrate.

8. The process of claim 7, wherein the tape strips have different predetermined widths.

9. The process of claim 8, wherein the tape strip laying system is an automated system.

10. The process of claim 1, wherein each path is defined for placement of a tape strip having a predetermined width.

11. The process of claim 1, wherein laying the tape strips includes laying the tape strips with a tape strip laying system.

* * * * *